Patented Dec. 1, 1942

2,303,765

UNITED STATES PATENT OFFICE 2,303,765

PREPARATION OF AMMONIUM ALLANTOINATE

William Robinson, Silver Spring, Md., assignor to Claude R. Wickard, as Secretary of Agriculture of the United States of America, and to his successors in office No Drawing. Application September 14, 1940, Serial No. 356,782

1 Claim. (Cl. 260—309)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a new therapeutic compound, which I prefer to name as ammonium allantoinate, and to its use as a treatment to stimulate healing of wounds and lesions, and to a process of making it.

An object of my invention is the production of a new compound suitable for therapeutic purposes.

Another object of my invention is the employment of my new compound in solution form on wet packs, or compresses, or by irrigation to wounds and lesions for the purpose of stimulating healing.

Still another object of my invention is a compound that can be used as a solution in the treatment of wounds or lesions to hasten the healing process.

A further object of my invention is a compound that can be applied to slow-healing wounds or lesions as an aqueous solution to promote the growth of healthy granulations in the wound, the removal of necrotic tissue and the reduction of infection, thereby cleansing the wound and stimulating the healing process.

A still further object of my invention is the preparation of a new compound in solution form, either concentrated or diluted.

Allantoin is a metabolic product found to be present in the secretions of blowfly maggots (Robinson, W., Jr. Bone Joint Surg. 17:267-271, 1935), and shown to be one of the substances responsible for the healing effects produced by maggots in slow-healing and discharging wounds. The healing properties of allantoin have since been confirmed through widespread use of this product in the last six years by the medical profession and also through several articles published in medical journals. It has also resulted in two U. S. Patents Nos. 2,104,738 and 2,124,295. I have recently discovered that ammonia is present in the secretions of the blowflies, and have demonstrated that ammonia also has outstanding therapeutic properties in stimulating healing of wounds (Robinson, W., Amer. Journ. Surg. 47:111, 1940).

It is certain that allantoin and ammonia bring about their characteristic healing effects in slow-healing wounds by different means. For instance, while allantoin can be decomposed chemically to form ammonia, it is known that this does not happen in human tissues, because the enzymes (allantoinase and allantoicase), necessary to do it, are absent. Allantoin is derived in nature from the decomposition of the cell nucleus, and it is of purine origin. When allantoin is applied to a wound it is utilized intact within the tissues, and it reenters into the nucleus, thus stimulating cell proliferation in the wound.

Ammonia, on the other hand, has recently been found to be utilized by the cells to form certain amino acids, such as glutamic acid, aspartic acid, arginine and glycine (Euler, H., et al., Hoppe-Seyler's Zt. Physiol. Chem. 254:61-103, 1938.,— Rittenberg, D., et al., Jr. Biol. Chem. 128:603-607, 1939).

When ammonia is used therapeutically in the forms of amonium carbonate or bicarbonate, which are the two forms in which it is found in the secretions of blowfly maggots, it reacts rapidly in the wound and causes a slight stinging sensation to which some patients and doctors seem to object. Allantoin, however, causes no stinging. It is soothing and decreases pain in the wound.

It was desired to form some combination of these two valuable healing agents that would permit the full healing effects of each, and yet avoid the stinging caused by ammonia, when used alone. In the science of chemistry it is known that some substances are amphoteric, that is, they will combine with either a base or an acid to form a salt; and it so happens that allantoin is one of those amphoteric substances. It was, therefore, conceived by me to combine ammonia, which is a base, with allantoin, thereby producing ammonium allantoinate, a hitherto unknown substance.

My new compound, ammonium allantoinate, has the approximate composition represented by the following formula: $C_4H_5N_4O_3 \cdot NH_4$.

I have found that the advantages of the combination of allantoin with ammonia to form the salt, ammonium allantoinate, are for example, as follows:

(a) It brings two powerful and dissimilar healing agents together in one product.

(b) It renders ammonia painless when combined with allantoin, and can be applied to any sensitive surface, even including the eye.

(c) It greatly increases the solubility of allantoin, making it at least fifteen times more soluble. This is desirable as allantoin alone is only 0.6% soluble in water, whereas ammonium allantoinate is at least 9% soluble. This means that much more allantoin can be applied to wounds in solution form. This is advantageous, as in certain types of wounds a higher concentration of allantoin, as above provided for, will aid in the stimulation of vascular granulations, the removal of necrotic tissue, and the reduction of infection, thereby cleansing the wound and bringing about desired healthy conditions requisite to rapid healing.

It is well known that ammonia is soluble in water up to 30%, and that allantoin is not, being only 0.6%. However, when allantoin is combined with ammonia, ammonium allantoinate is formed, which is 9% soluble in water, thus increasing the solubility of allantoin.

I have prepared ammonium allantoinate in sterile solution and have, through medical cooperators, used it in the treatment of many types of slow-healing wounds and lesions, with especially favorable results.

My compound is prepared and used in solution form. My method for preparing it for ready use is substantially as follows: A flask containing 500 c. c. of preferably sterile distilled water is heated to near the boiling point. The flask is then removed from the heater and 3.0 grams of allantoin is added to the water and thoroughly shaken until dissolved. The water is allowed to cool to near room temperature when 2.4 grams of ammonium hydroxide is added and shaken until thoroughly mixed. In this way, the ammonia combines with the allantoin, and produces ammonium allantoinate, in solution form at a pH of about 8.8.

I may increase the concentration of my compound in water up to the limit of its solubility for purposes of economy in handling and transportation. Water may be subsequently added to form the desired dilution for healing purposes, otherwise at that high concentration my compound might cause stinging.

I may prepare my compound in solution and in concentrated form by heating 500 c. c. of preferably sterile distilled water in a flask to near the boiling point. The flask is then removed from the heater and an amount of allantoin ranging from 3 grams to 45 grams is added to the water and thoroughly shaken until dissolved. The amount of allantoin that is added depends upon the concentration desired. The water is then allowed to cool to the temperature just above that at which allantoin begins to crystallize out, as hereinafter shown; then the combining weight of ammonia in the form of ammonium hydroxide is added and thoroughly shaken, during which time the ammonia combines with the allantoin and forms my compound, ammonium allantoinate. The amount of ammonium hydroxide to be added is governed by the amount of allantoin that is used and the proportions are 0.8 part of ammonium hydroxide to one part of allantoin.

I have also found that in preparing my product in concentrated form, and still in solution, it is necessary to add the ammonia, as herein described, before the solution has cooled beyond the point of crystallization of allantoin. This is due to the fact that the more concentrated the allantoin solution, the higher is the temperature at which it will begin to crystallize out, making it difficult for the ammonia to combine with the crystalline allantoin.

I have also found that when 45 grams of allantoin are dissolved in 500 c. c. of water, heated to about 200° F., crystallization will begin at about 180° F. Whereas, when 3 grams of allantoin are similarly dissolved, the temperature can drop to about 60° F. before crystallization takes place. Other quantities and temperatures bear a straight-line relationship to these two conditions.

I may also prepare my product by dissolving allantoin, as heretofore described, and then forcing ammonia gas through the solution.

Having thus described my invention, what I claim for Letters Patent is:

A process for the preparation of ammonium allantoinate in concentrated form, which comprises essentially subjecting allantoin in an amount ranging from 3 grams to 45 grams to the action of substantially 500 c. c. of water heated just below the boiling point, the while agitating the mass, thereby forming a solution; thence permitting the solution to cool to a temperature which does not crystallize the allantoin; thence adding to the solution the combining weight of ammonia in the form of ammonium hydroxide; and thence subjecting the solution to vigorous agitation, thereby combining the ammonia with the allantoin and producing ammonium allantoinate.

WILLIAM ROBINSON.